(12) United States Patent  
Fehr

(10) Patent No.: US 9,392,738 B1  
(45) Date of Patent: Jul. 19, 2016

(54) LAND ROLLER IMPLEMENT HAVING MULTI-ROLLER WINGS WITH FOLD-OVER SUBFRAMES

(71) Applicant: Travis Mark Fehr, Morden (CA)

(72) Inventor: Travis Mark Fehr, Morden (CA)

( * ) Notice: Subject to any disclaimer, the term of this patent is extended or adjusted under 35 U.S.C. 154(b) by 0 days.

(21) Appl. No.: 14/740,447

(22) Filed: Jun. 16, 2015

Related U.S. Application Data

(60) Provisional application No. 62/118,518, filed on Feb. 20, 2015.

(30) Foreign Application Priority Data

Feb. 23, 2015 (CA) ..................................... 2883187

(51) Int. Cl.
*A01B 73/02* (2006.01)
*A01B 73/04* (2006.01)
*A01B 29/02* (2006.01)

(52) U.S. Cl.
CPC ............... *A01B 73/048* (2013.01); *A01B 29/02* (2013.01)

(58) Field of Classification Search
CPC ........ A01B 29/02; A01B 29/06; A01B 49/06; A01B 63/32; A01B 73/06; A01B 73/067; A01B 63/14; A01B 63/24; A01B 63/00; A01B 79/02; A01B 79/00; A01B 49/04; A01B 49/00; A01B 73/02; A01B 73/048
USPC ................. 172/170, 311, 459, 423, 460, 536, 172/799.5, 171–176, 179, 185, 187, 199; 111/130, 200
See application file for complete search history.

(56) References Cited

U.S. PATENT DOCUMENTS

| | | | |
|---|---|---|---|
| 4,479,554 A | 10/1984 | Kueker | |
| 4,896,732 A | 1/1990 | Stark | |
| 6,119,788 A | 9/2000 | Bernier | |
| 6,374,922 B1 | 4/2002 | Friggstad | |
| 8,118,110 B2 | 2/2012 | Tamm et al. | |
| 8,342,256 B2 | 1/2013 | Adams et al. | |
| 8,820,428 B2 | 9/2014 | McCrea et al. | |
| 2008/0314605 A1 | 12/2008 | Degelman et al. | |

FOREIGN PATENT DOCUMENTS

| | | |
|---|---|---|
| CA | 2668238 | 12/2010 |
| CA | 2810124 | 9/2014 |
| DE | 8528463 | 9/1986 |
| DE | 3634175 | 4/1988 |
| DE | 29815637 | 7/1999 |
| EP | 461280 | 12/1991 |
| ES | 2128911 | 1/2000 |
| FR | 2676157 | 11/1992 |
| GB | 2110061 | 6/1983 |

*Primary Examiner* — Robert Pezzuto
(74) *Attorney, Agent, or Firm* — Kyle R. Satterthwaite; Ryan W. Dupuis; Ade & Company Inc.

(57) ABSTRACT

A land roller implement with fold-out wings features at least one raisable/lowerable roller on each wing that is carried on a movable subframe that is pivotally mounted to the main frame of the wing. The movable subframe is pivotal up into a folded position overlying the main frame of the wing so that the raisable/lowerable roller is elevated overtop of an adjacent roller on the same wing. This minimizes the width of the implement when the wings are folded in to lie longitudinally of the implement for transport.

11 Claims, 18 Drawing Sheets

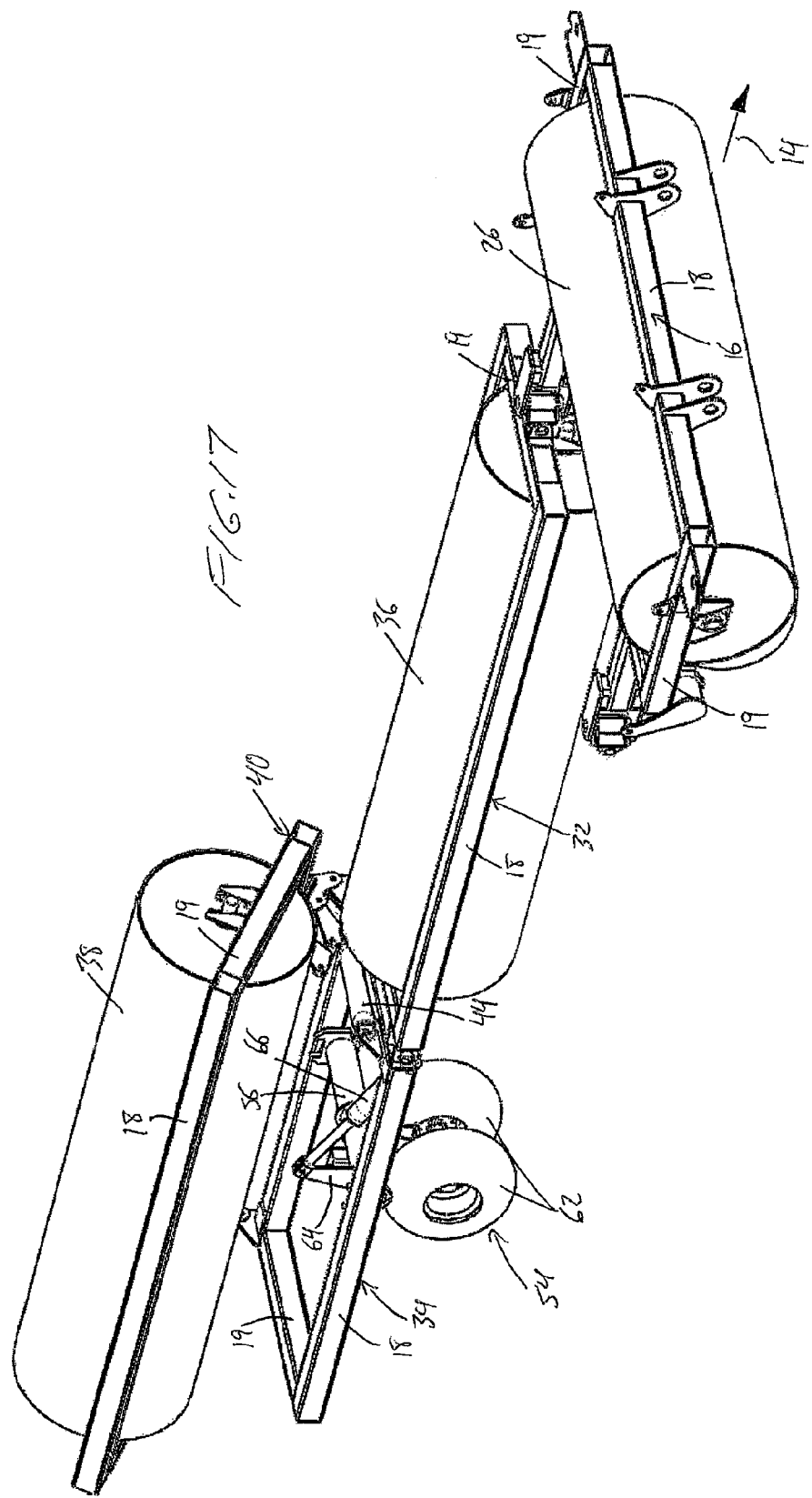

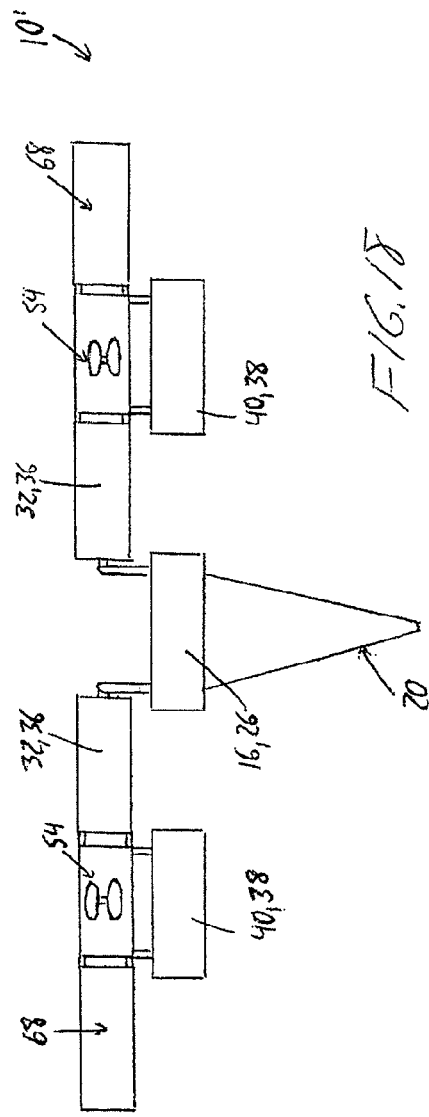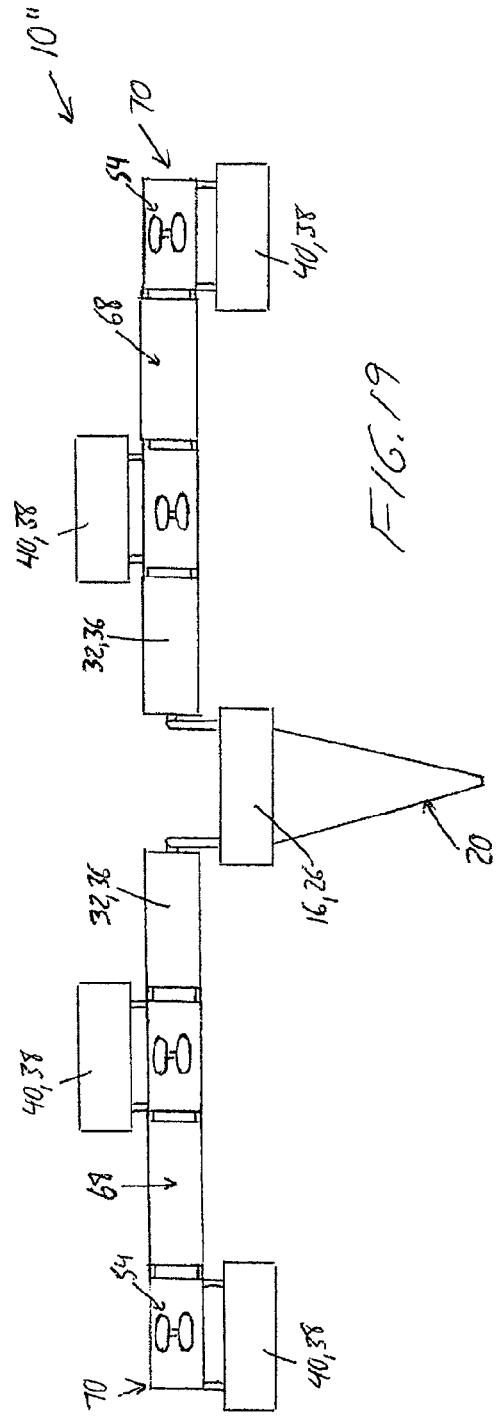

US 9,392,738 B1

LAND ROLLER IMPLEMENT HAVING MULTI-ROLLER WINGS WITH FOLD-OVER SUBFRAMES

CROSS REFERENCE TO RELATED APPLICATIONS

This application claims benefit under 35 U.S.C. 119(a) of U.S. Provisional Patent Application No. 62/118,518, filed Feb. 20, 2015 and of Canadian Patent Application Serial No. 2,883,187, filed Feb. 23, 2015.

FIELD OF THE INVENTION

The present invention relates generally to fold-out land roller implements, and more particularly to an improved design in which one or more rollers on each fold-out wing are carried on fold-up subframes to enable lifting of these rollers up over the others into positions lying generally in-line therewith to minimize the width of the implement in transport mode.

BACKGROUND

Land roller implements are used to compact and flatten the ground in agriculture and other applications. A common type of land roller has a center section that is towed by a tractor or other tow vehicle and features a central roller, and a pair of fold out wings that are hinged to the center section for pivotal movement relative thereto about upright axis, and that each carry one or more rollers. The wing rollers lie longitudinally of the implement behind the center section in a transport mode of the implement and span laterally outward from the center section in a working mode.

Examples of such fold-out land roller implements can be found in US2008/0314605, U.S. Pat. No. 8,820,428, CA2668238, and CA2810124. Other folding implements, including land rollers and other agricultural implements, can be seen in DE3634175, DE8528463, DE29815637, EP-461280, ES2128911, U.S. Pat. No. 4,479,554, U.S. Pat. No. 4,896,732, U.S. Pat. No. 6,119,788, U.S. Pat. No. 8,118,110 and U.S. Pat. No. 8,342,256.

In some implements with multiple roller sections per wing, a break or gap in the effective land-rolling area of each wing is avoided by supporting the rollers in fixed positions on the wing that longitudinally-overlap one another while being horizontally offset from one another, whereby the rollers lie one in front of the other in the working mode of the implement and provide continuous roller coverage over the full length of the wing. However, the horizontally offset positions of the statically supported rollers increase the width of the machine across the folded up wings in the transport mode.

Accordingly, there is a need for a land roller solution that helps reduce or minimize the transport width of a land roller with multi-roller fold-out wings.

SUMMARY OF THE INVENTION

According to one aspect of the invention there is provided a land roller implement for rolling movement across the ground in a forward working direction of a towing vehicle, the implement comprising:

a central frame;

a hitch member connected to the central frame and arranged for connection to the towing vehicle for movement therewith in the forward working direction;

first and second wing frames, each of which is elongated in a longitudinal direction between a respective inner end that is pivotally coupled to the central frame and an opposing outer end;

the first and second wing frames being pivotal about respective upright axes between respective working positions spanning laterally outward in opposing directions from the central frame so as to be oriented transversely to the forward working direction and respective transport positions extending rearwardly from the central frame such that the longitudinal directions of the first and second wing frames extend generally parallel to the forward working direction;

each of the first and second wing frames having a respective first roller and respective second roller, each of which is supported on the wing for rolling movement on the ground in the forward working direction in the working position of the wing frame, each first roller having a proximal end residing adjacent the central frame and a distal end spaced from the proximal end in the longitudinal direction and each second roller residing adjacent the distal end of the respective first roller in the longitudinal direction;

wherein one of said first and second rollers of each wing is a raisable and lowerable roller carried on a respective movable subframe pivotally coupled to the respective wing frame, the respective movable subframe being pivotal about a respective pivot axis lying generally parallel to the longitudinal directions of the first and second wings for raising and lowering of said subframe about the respective pivot axis between a folded position overlying the wing frame with said raisable and lowerable roller elevated over the other of said first and second rollers and a deployed position lying alongside the wing frame with said raisable and lowerable roller lowered onto the ground for rolling movement thereover in the forward working direction.

Preferably each wing frame comprises a respective ground wheel assembly mounted thereto at a location that resides beneath the respective movable subframe in the folded position thereof, each ground wheel assembly comprising at least one ground wheel that is lowerable against the ground to lift the respective wing and bring the other of said first and second rollers out of contact with the ground, and raisable from the ground to lower the respective wing and bring the other of said first and second rollers thereof into contact with the ground.

Preferably each ground wheel assembly comprises a support shaft spanning transversely between side members of the wing frame that lie in the longitudinal direction thereof.

Preferably the support shaft of each ground wheel assembly is rotatable, and the ground wheel assembly comprises a ground wheel actuator coupled to the shaft to drive rotation thereof in opposite directions to raise and lower the respective ground wheel.

Preferably the ground wheel actuator comprises a linear actuator coupled between the respective wing frame and a connection lug on the shaft.

Preferably the first and second rollers of each wing frame overlap one another in the longitudinal direction of the respective wing frame.

Each wing frame may have a respective third roller rotatably supported thereon at a position situated adjacent an outboard end of the movable subframe for rolling movement on the ground in the forward working direction in the working position of the wings.

In such instances, preferably the first and third roller of each wing frame align with one another, and the second roller of each wing frame is the raisable and lowerable roller thereof and is forwardly or rearwardly offset from the first and third rollers in the forward working direction when the respective subframe is in the deployed position.

Each wing frame may further comprise a respective fourth roller rotatably carried on a respective second movable subframe that is pivotally coupled to the wing frame in like manner to the movable subframe on which the raisable and lowerable roller is carried for rolling movement of the respective fourth roller on the ground in the forward working direction in the deployed position of the second subframes and working position of the wings.

According to a second aspect of the invention, there is provided a land roller implement for rolling movement across the ground in a forward working direction of a towing vehicle, the implement comprising:

a central frame;

a hitch member connected to the central frame and arranged for connection to the towing vehicle for movement therewith in the forward working direction;

first and second wing frames, each of which is elongated in a longitudinal direction between a respective inner end that is pivotally coupled to the central frame and an opposing outer end;

the first and second wing frames being pivotal about respective upright axes between respective working positions spanning laterally outward in opposing directions from the central frame so as to be oriented transversely to the forward working direction and respective transport positions extending rearwardly from the central frame such that the longitudinal directions of the first and second wing frames extend generally parallel to the forward working direction, each of the first and second wing frames having a respective first roller supported on the wing for rolling movement on the ground in the forward working direction in the working position of the wing frame, each first roller having a proximal end residing adjacent the central frame and a distal end spaced from the proximal end in the longitudinal direction;

a respective movable subframe pivotally coupled to each of the first and second wing frames at a position residing adjacent the distal end of the respective first roller, the respective movable subframe being pivotal about a respective pivot axis lying generally parallel to the longitudinal directions of the first and second wings for raising and lowering of said subframe about the respective pivot axis between a folded position overlying the wing frame and a deployed position lying alongside the wing frame;

a respective second roller supported on the movable subframe of each wing frame for rolling movement on the ground in the forward working direction in the deployed positions of the subframes and the working positions of the wings, the movable subframes being arranged to elevate the second rollers above the first rollers under raising of the movable sub frames from the deployed position into the folded position.

BRIEF DESCRIPTION OF THE DRAWINGS

Preferred embodiments of the invention will now be described in conjunction with the accompanying drawings in which:

FIG. 17 is a front side perspective view of the wing and central roller section of FIG. 9.

FIG. 18 schematically illustrates a seven-roller implement of the present invention.

FIG. 19 schematically illustrates a nine-roller implement of the present invention.

In the drawings like characters of reference indicate corresponding parts in the different figures.

DETAILED DESCRIPTION

Figure 1:
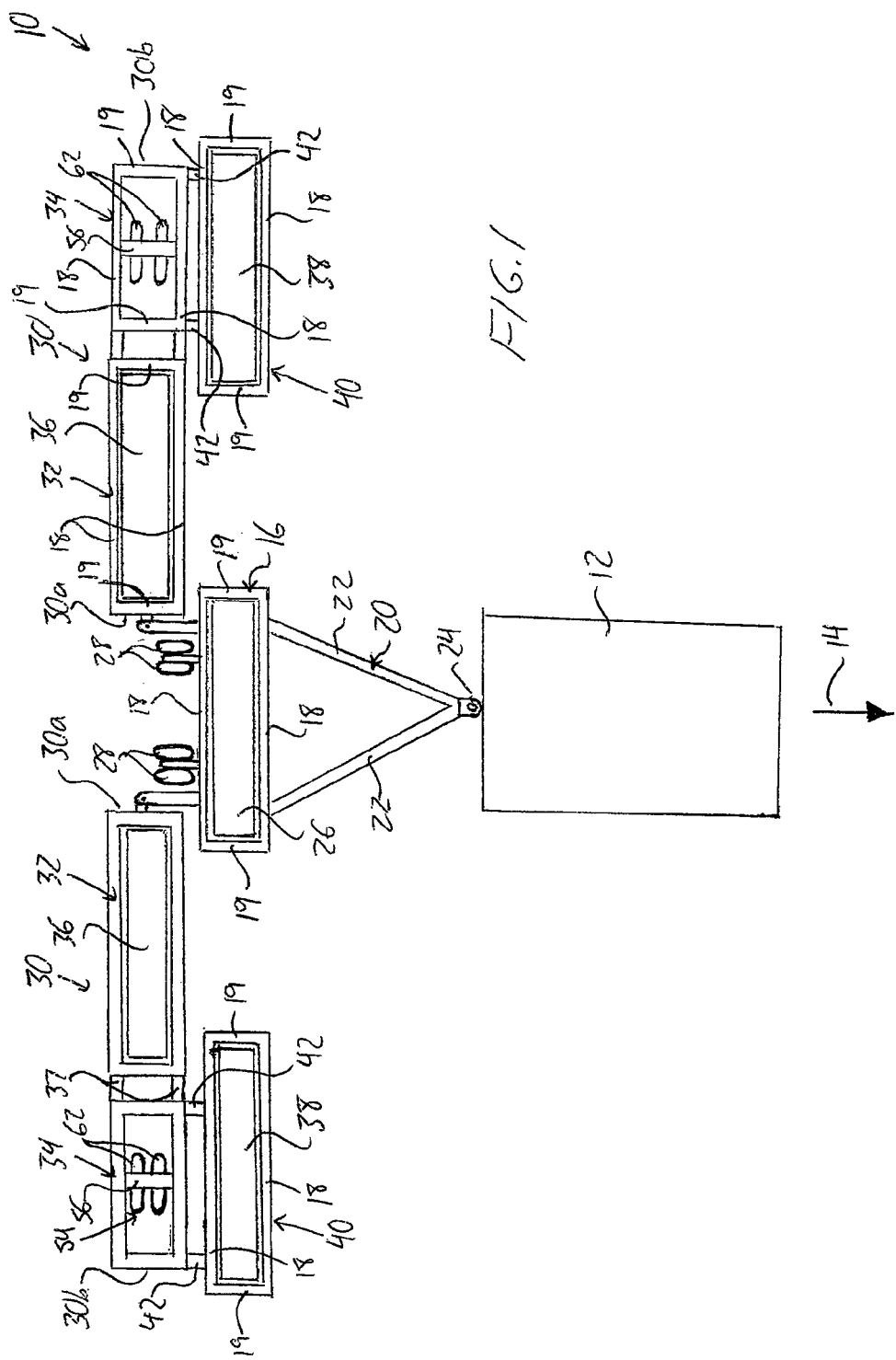
FIG. 1 is a schematic overhead plan view of a five-roller land roller implement of the present invention hitched to a tractor for use of the implement in a working mode, in which two wings of the implement are swung out from a central roller section into laterally extending working positions and raisable/lowerable outer rollers on the two wings are lowered into rolling contact with the ground.
Figure 2:
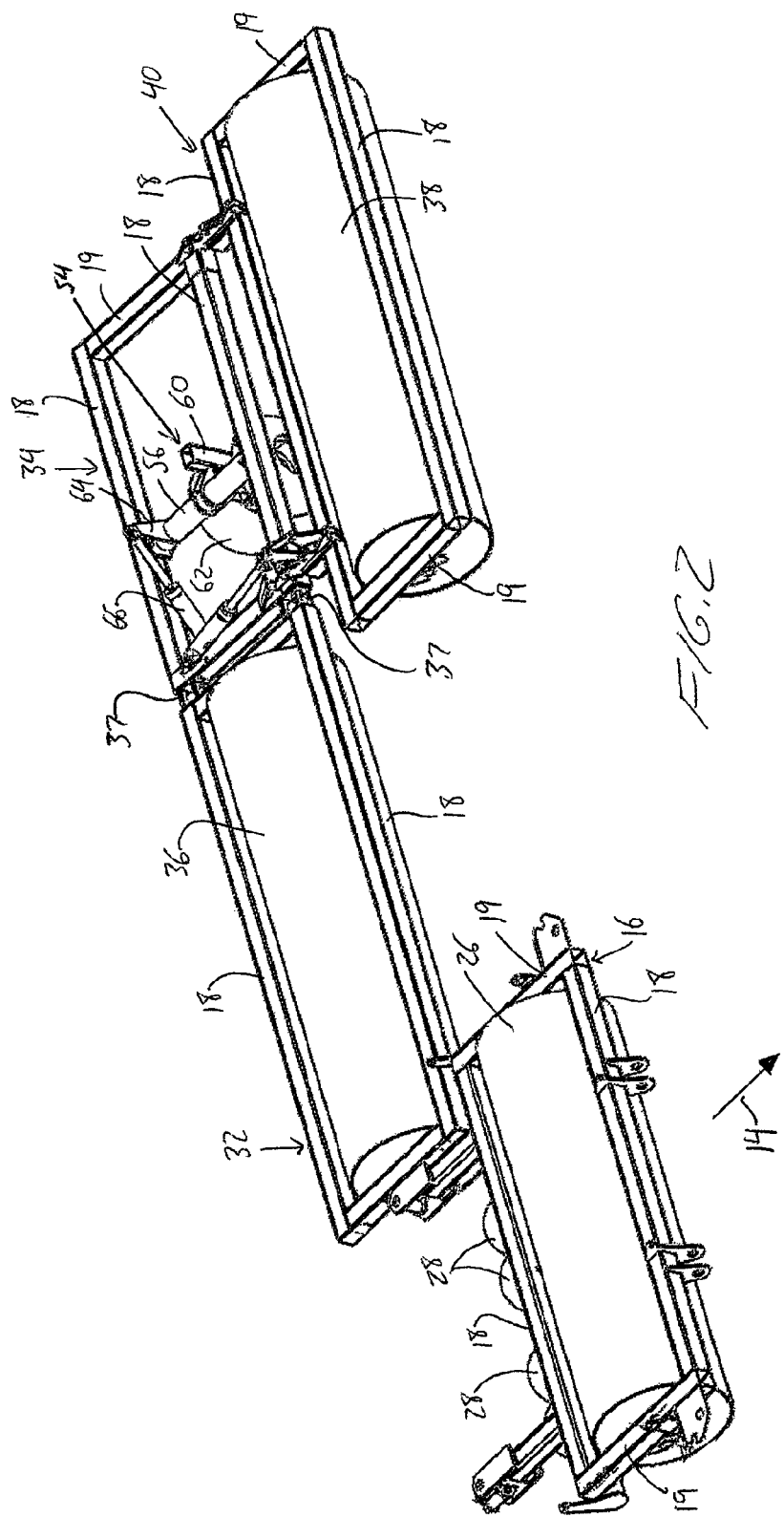
FIG. 2 is a top front perspective view of one wing and the central roller section of the five-roller implement of FIG. 1 with the wing swung out and the respective outer rollers lowered toward the ground out of a stowed position over the wing.
Figure 3:
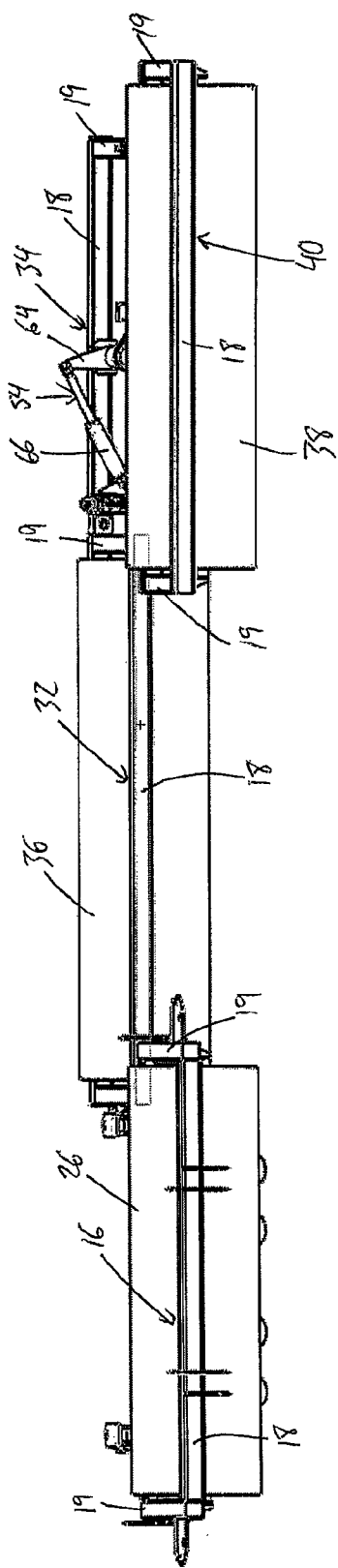
FIG. 3 is a front elevational view of the wing and central roller of FIG. 2.
Figure 4:
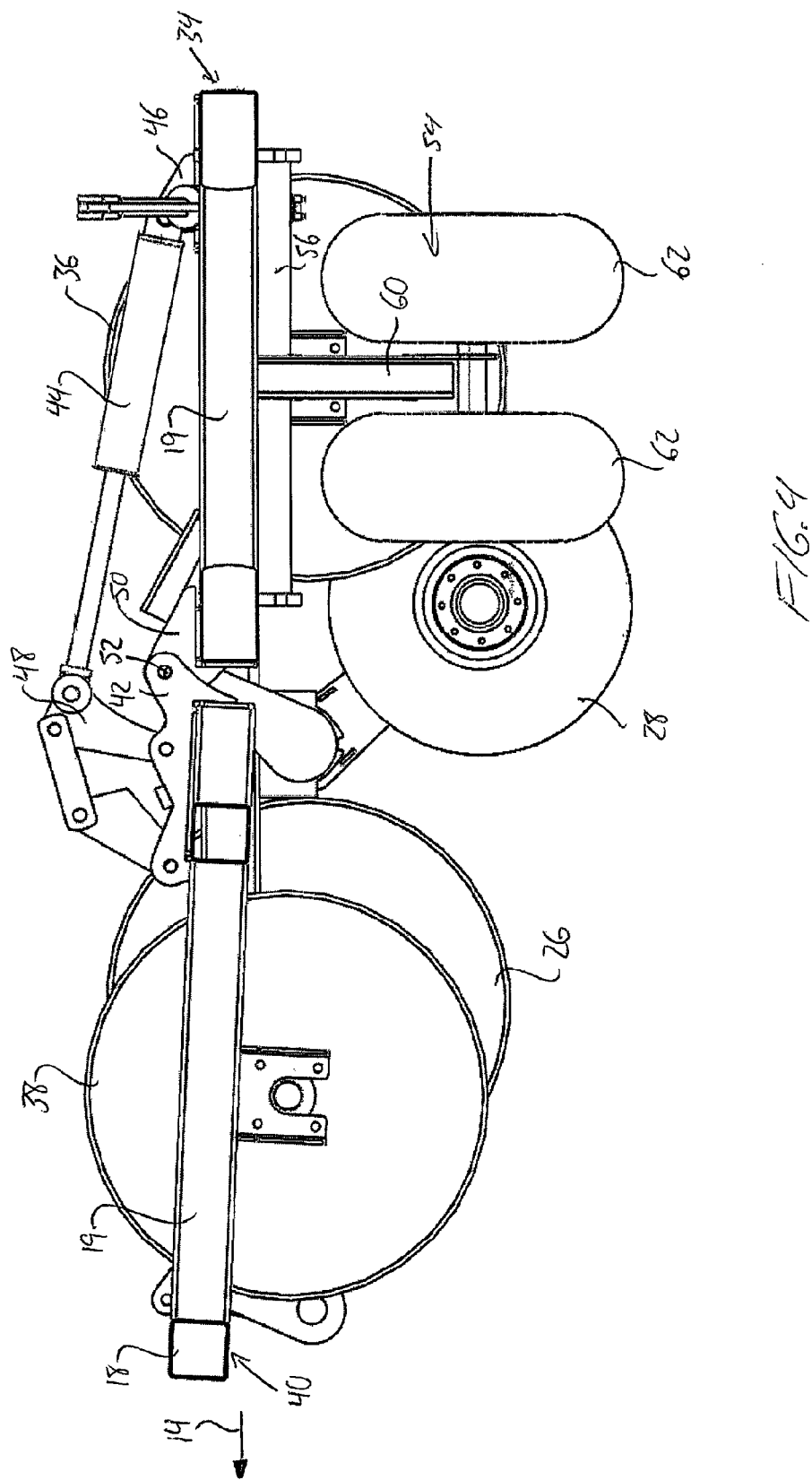
FIG. 4 is a side elevational view of the wing and central roller section of FIG. 2.
Figure 5:
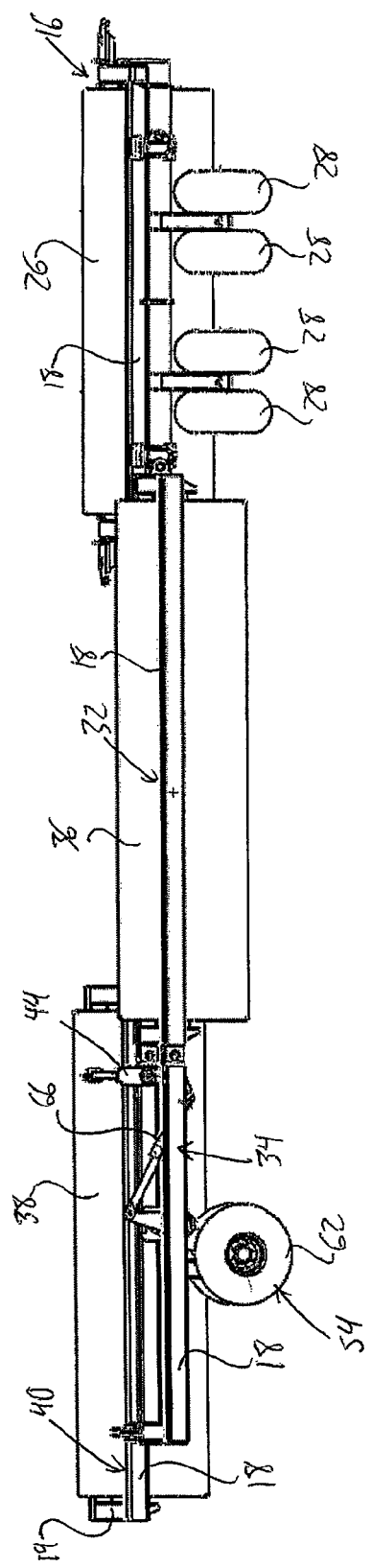
FIG. 5 is a rear elevational view of the wing and central roller of FIG. 2.
Figure 6:
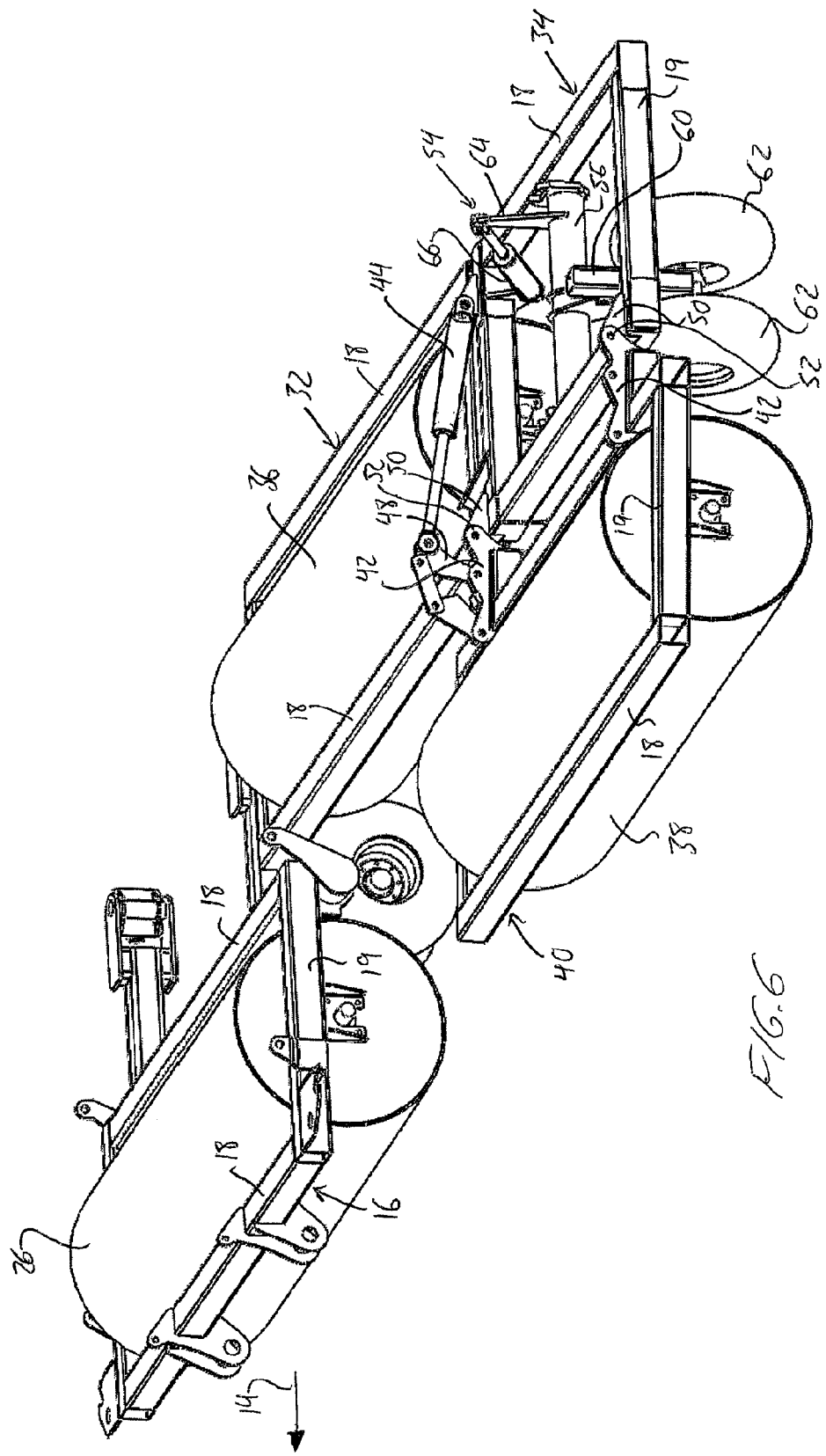
FIG. 6 is a front side perspective view of the wing and central roller of FIG. 2.
Figure 7:
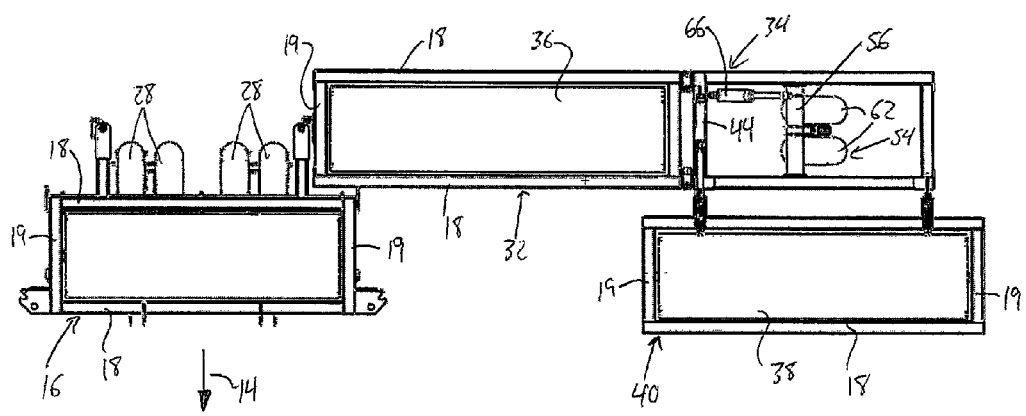
FIG. 7 is an overhead plan view of the wing and central roller of FIG. 2.
Figure 8:
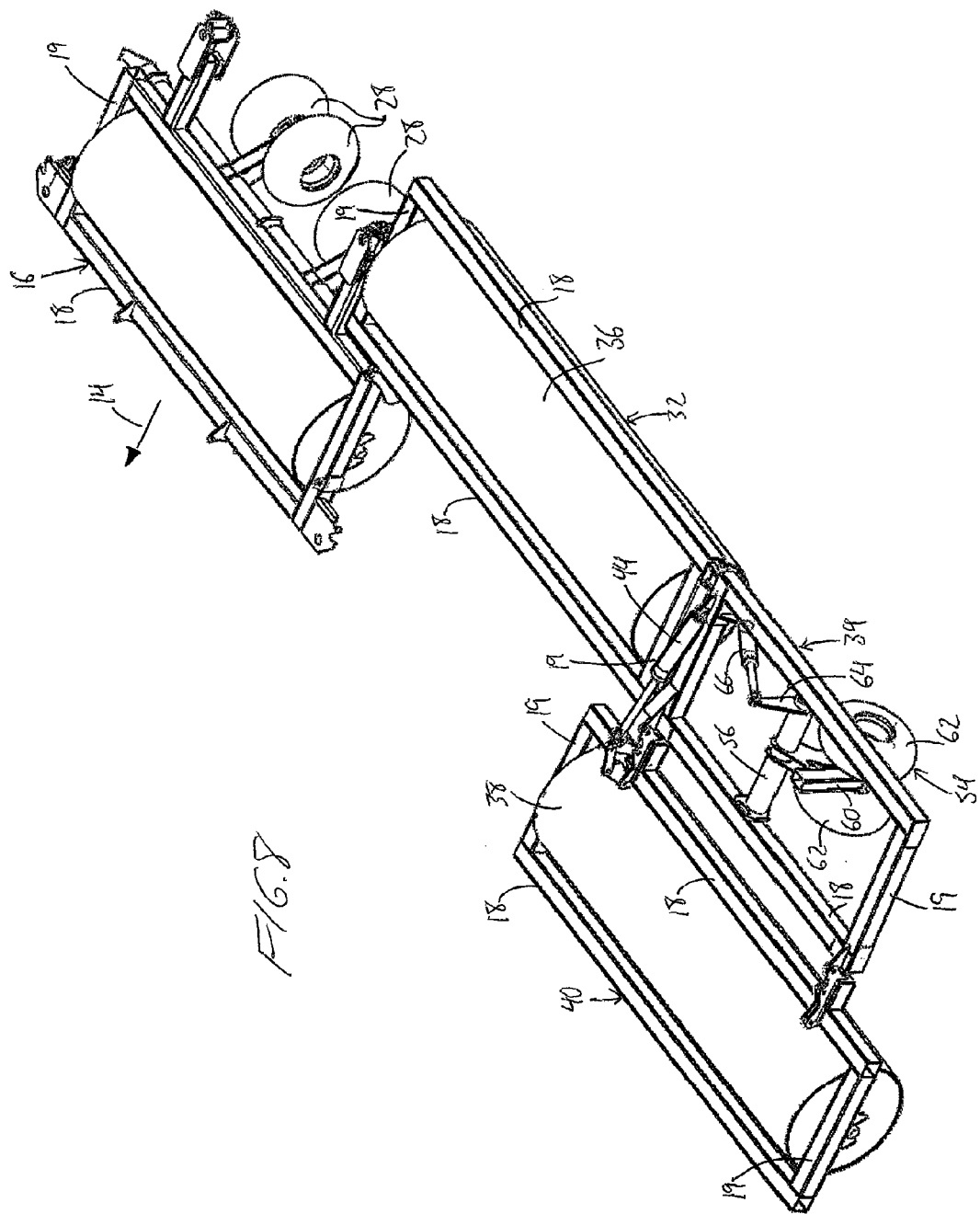
FIG. 8 is a rear perspective view of the wing and central roller of FIG. 2.
Figure 9:
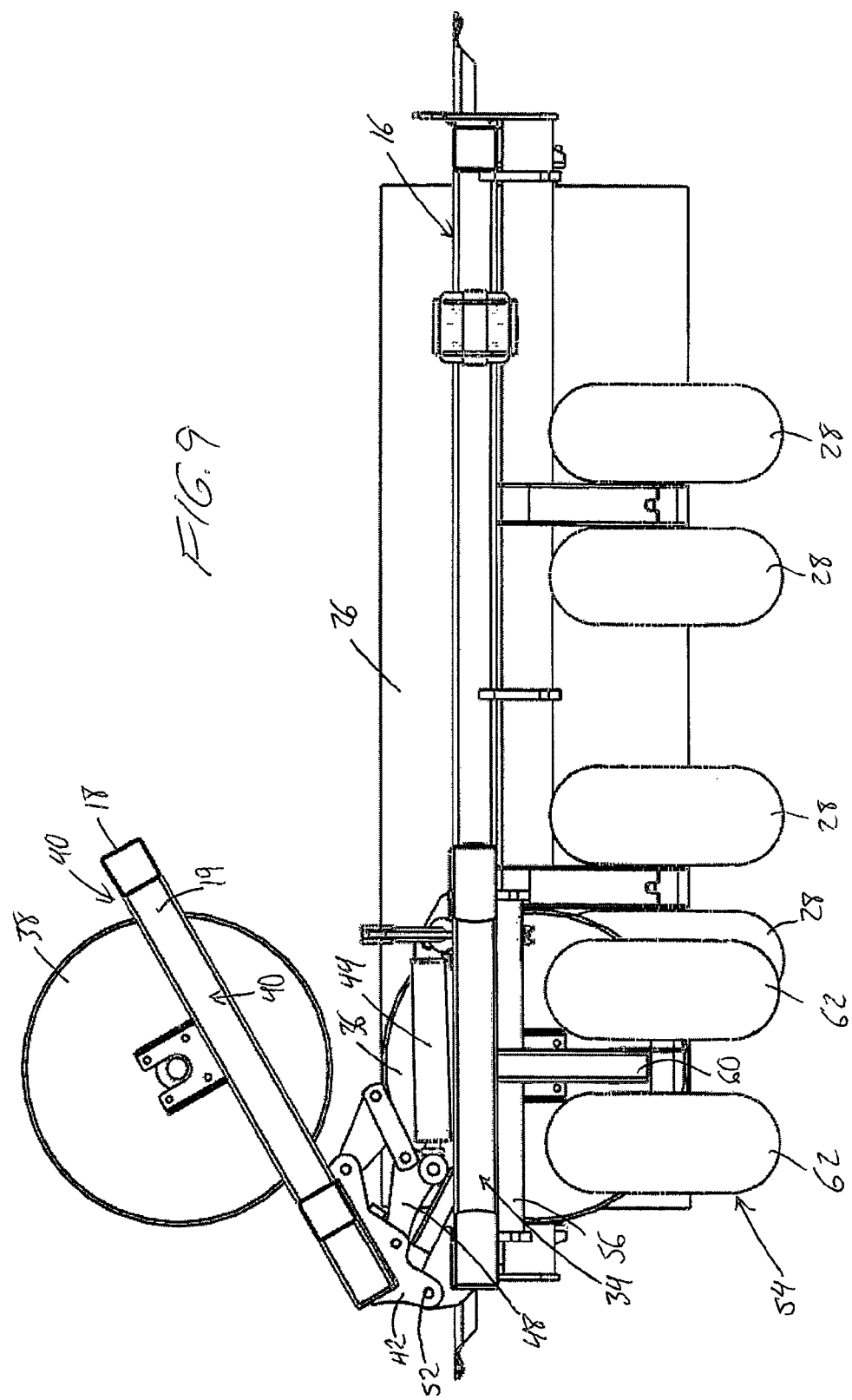
FIG. 9 is a rear elevational view of the wing and central roller section of FIG. 2 with the wing in a transport position and the outer roller raised up into a stowed position above the wing.
Figure 10:
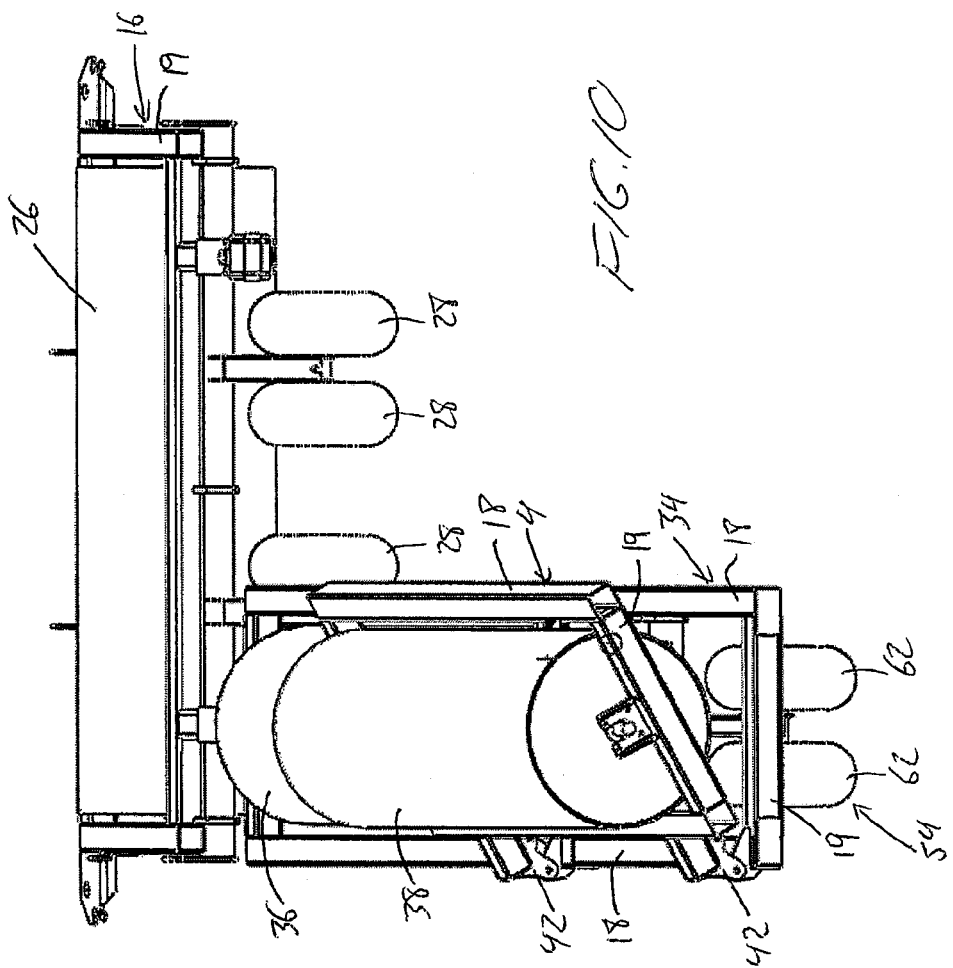
FIG. 10 is a top rear perspective view of the wing and central roller section of FIG. 9.
Figure 11:
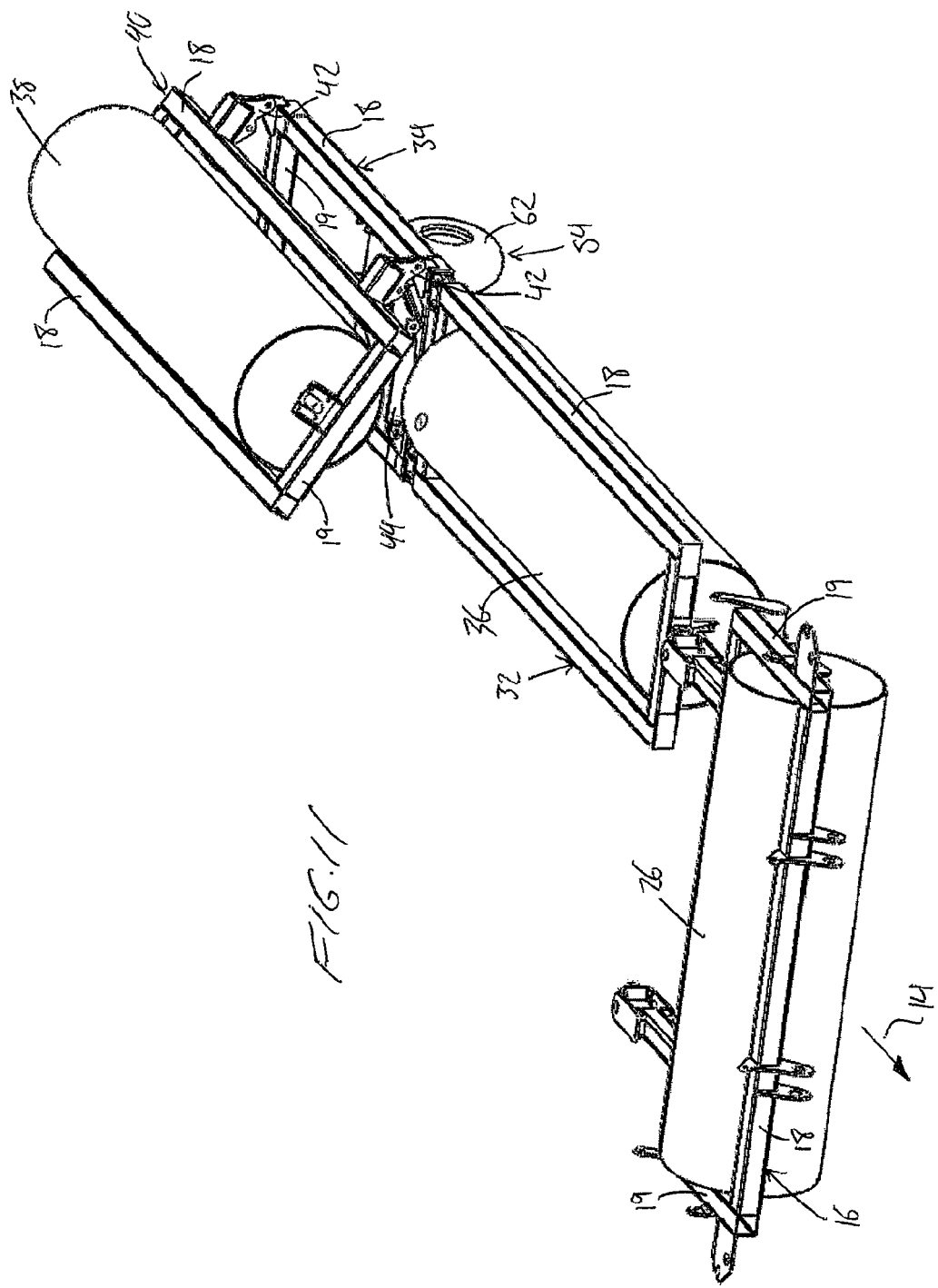
FIG. 11 is a top front perspective view of the wing and central roller section of FIG. 9.
Figure 12:
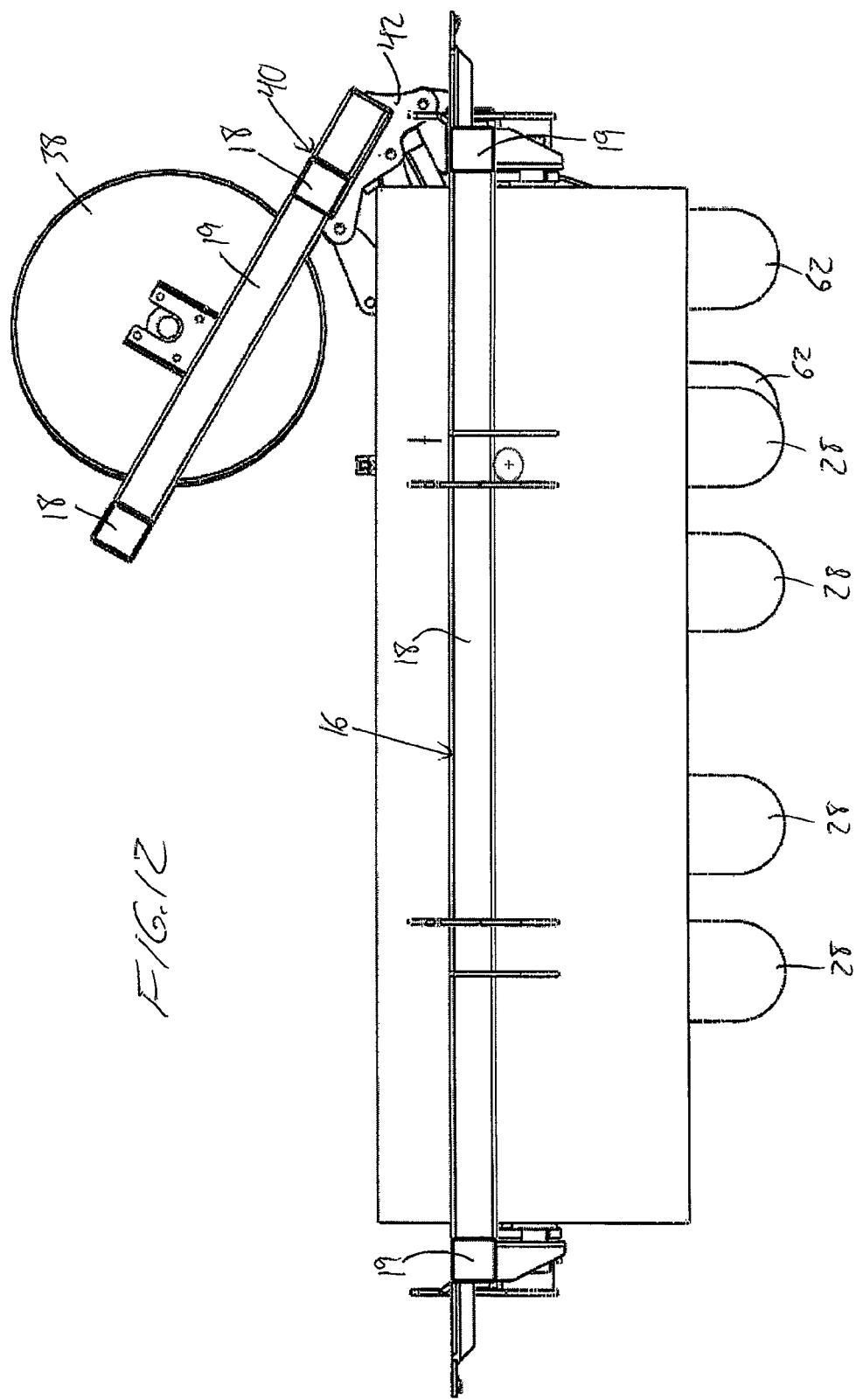
FIG. 12 is a front elevational view of the wing and central roller section of FIG. 9.
Figure 13:
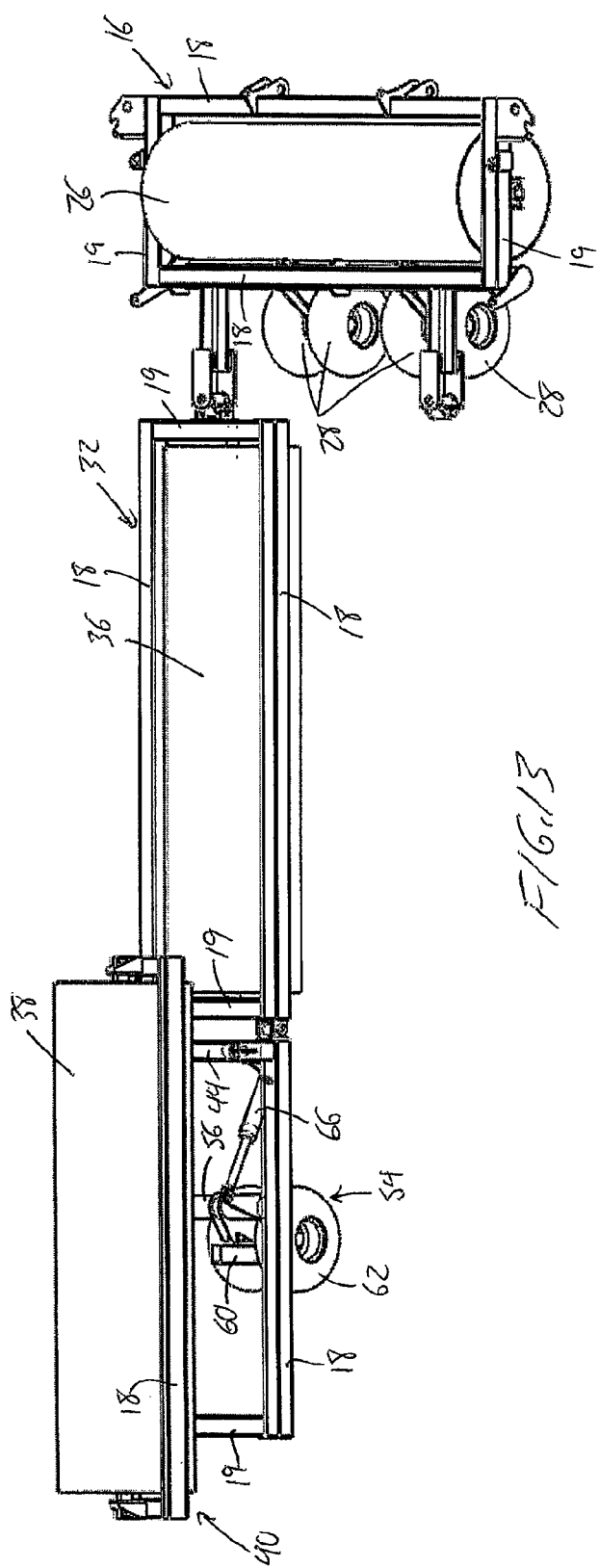
FIG. 13 is a top side perspective view of the wing and central roller section of FIG. 9.
Figure 14:
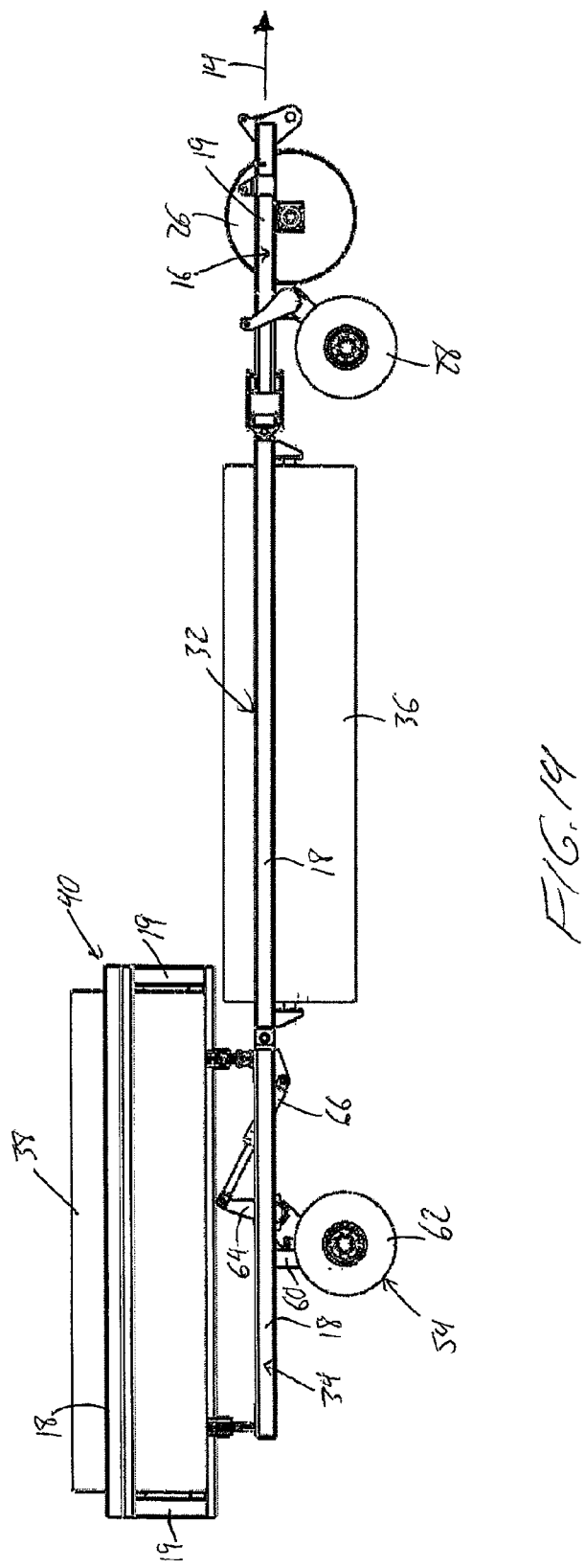
FIG. 14 is a side elevational view of the wing and central roller section of FIG. 9.
Figure 15:
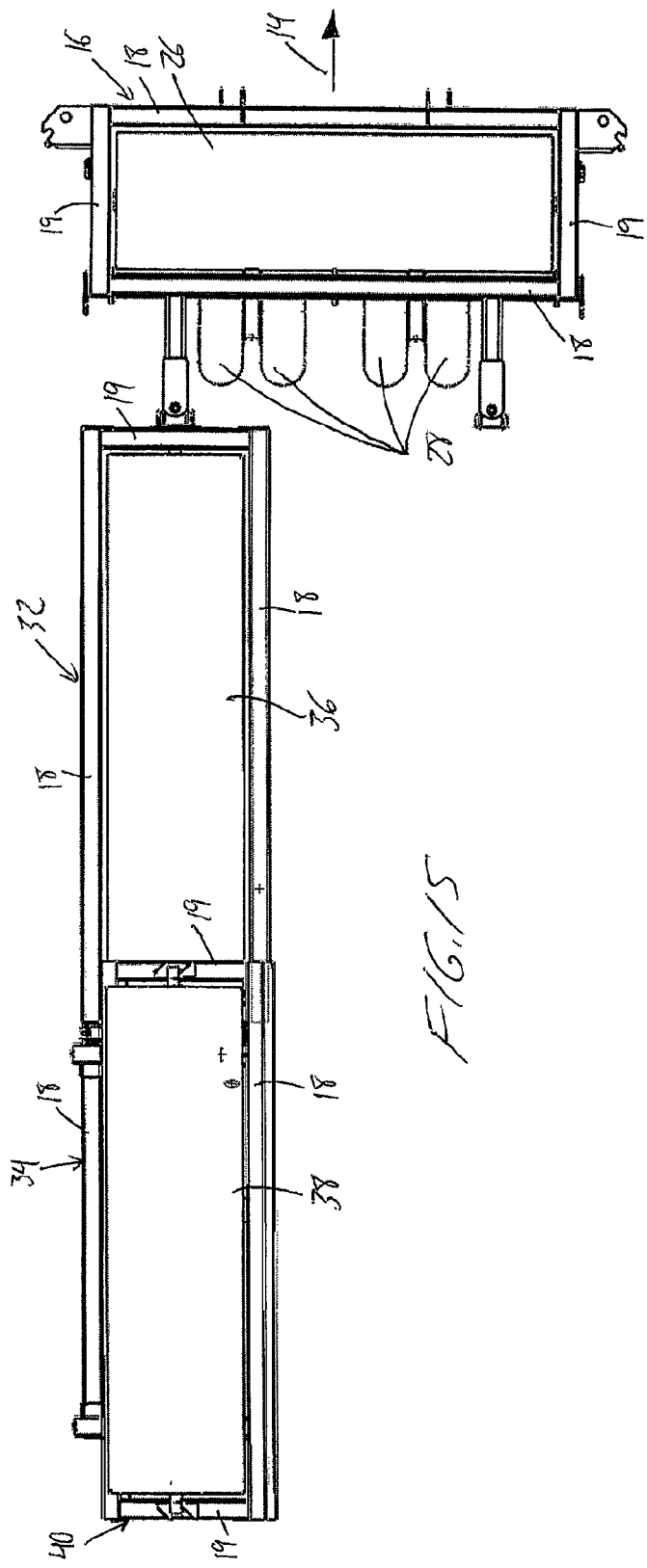
FIG. 15 is an overhead plan view of the wing and central roller section of FIG. 9.
Figure 16:
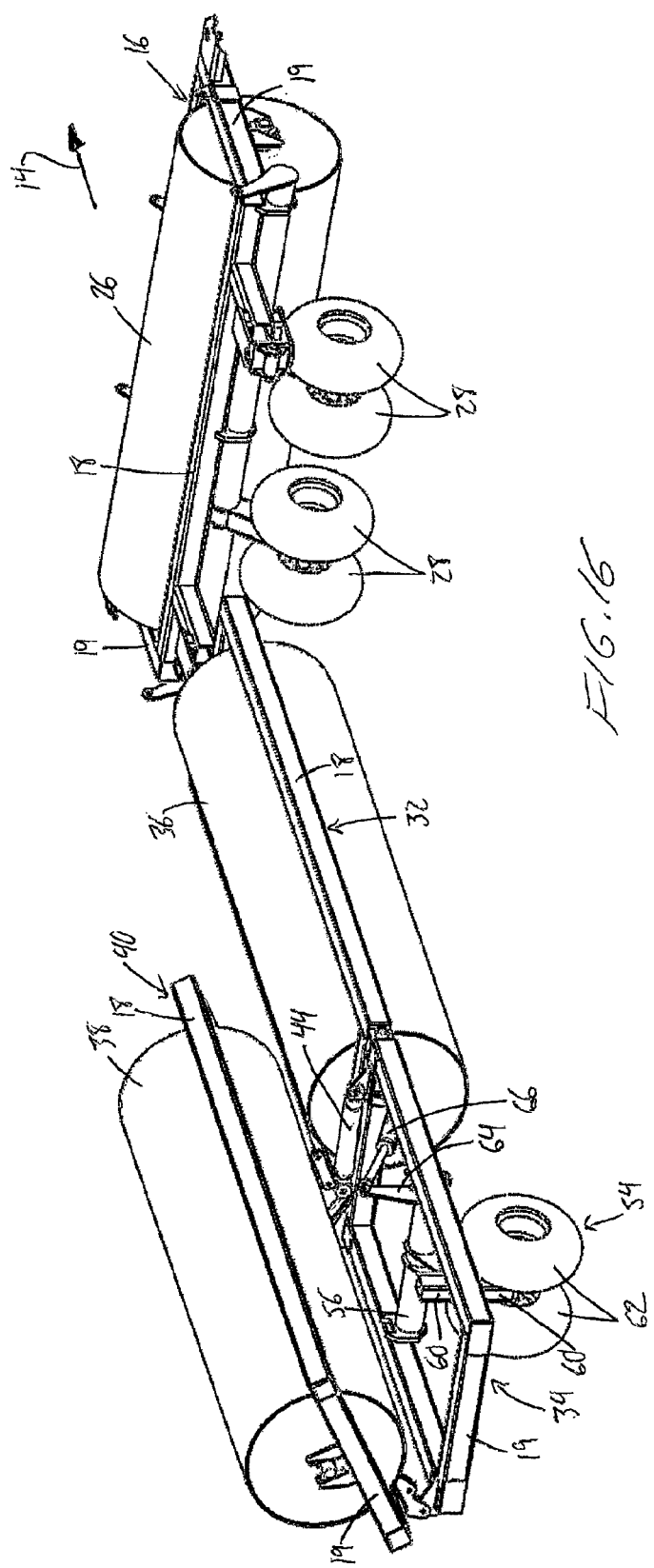
FIG. 16 is a rear side perspective view of the wing and central roller section of FIG. 9.

Referring to FIG. 1, there is illustrated a land roller implement generally indicated by reference numeral 10. The implement 10 is particularly suited for use with a towing vehicle, for example a tractor 12 for rolling movement across the ground in a forward working direction 14 of the tractor. The implement 10 features a central frame 16 which is elongated in a lateral direction perpendicular to the forward working direction. The central frame includes front and rear beams 18 spanning the width of the frame and interconnected by suitable crossbars 19 at opposing ends of the crossbars. A hitch member 20 is coupled to the front of the central frame portion 16. The hitch member generally comprises two arms 22 which are hinged at rear ends on the front beam of the central frame portion and which extend forwardly and inwardly to be joined at a front end locating a suitable coupling 24 for connection to the towing vehicle.

The central frame 16 supports a central roller 26 thereon between the beams 18 such that the roller 26 spans the full width of the frame between the crossbars 19 thereof. The roller is generally cylindrical in shape and is supported for rotation about a central horizontal axis thereof that extends in the lateral direction, whereby the roller 26 is arranged for rolling movement along the ground in the forward working direction 14. Transport wheels 28 are coupled to the rear of the central frame portion and include a suitable mechanism to permit the transport wheels 28 to be lowered for engagement into the ground to in turn raise the center roller 26 off of the ground for transport. Under normal use in a field, the transport wheels 28 are lifted so that the weight of the frame is carried on the central roller 26.

The implement 10 further comprises first and second wings 30 which are each elongated in a longitudinal direction from an inner end 30a that is coupled to the central frame 16 to an opposing free outer end 30b. Each of the first and second wings comprises an inner frame 32 and an outer frame 34 connected in series with one another in the longitudinal direction of the wing. Accordingly an inner end of the inner frame 32 is pivotally coupled to the central frame 16, and the inner end of the outer frame 34 is coupled to the outer end of the inner frame. Like the central frame 16, each of the inner and outer frames 32, 34 features parallel, opposing front and rear beams 18 that are perpendicularly interconnected at their opposing ends by crossbars 19. Similar to the central frame and its respective roller 26, each inner frame 32 rotatably carries a respective inner roller 36 between its longitudinal beams and crossbars for rotation about a horizontal roller axis extending in the longitudinal direction of the wing. The inner and outer frames of each wing are coupled to one another by pivotal connections 37 for articulating movement about a horizontal axis oriented perpendicularly to the longitudinal direction of the wing so as to be aligned in the forward working direction in the working position of the wings.

The land roller implement of the present invention deviates from conventional design in its support of a respective outer roller 38 at each outer frame 34, as the outer roller 38 is not mounted directly to the outer frame 34, but rather is carried by a movable subframe 40 that is pivotally coupled to the outer frame for upward and downward pivotal movement relative thereto about a horizontal pivot axis. Like the central frame 16 and inner and outer wing frames 32, 34, each subframe 40 features parallel, opposing front and rear beams 18 that are perpendicularly interconnected at their opposing ends by crossbars 19. The subframe 40 carries the outer roller 38 for rotation about a longitudinal axis extending in the longitudinal direction of the wing. The subframe 40 is pivotally coupled to one of the longitudinal beams 18 of the outer frame 34 by a pair of pivotal links 42 spaced apart from one another along the longitudinal direction of the wing.

In the longitudinal direction of each wing, the axial length of the inner roller 32 overlaps with the central roller 26 and the respective outer roller 38, whereby these rollers provide a continuous span of ground coverage in the lateral direction perpendicular to the forward working direction 14 when the wings are in the working positions. A hydraulic linear actuator 44 has one end thereof pivotally coupled to the outer frame 34, for example via a connection lug 46 standing upright from one of the outer frame's crossbars 19, and the other end pivotally coupled to a linkage 46 that includes one of the pivotal links 42 that join the subframe to the outer frame via respective mounting lugs 50 that stand upright from the outer frame adjacent opposing ends of the longitudinal beam 18. Extension and retraction of the actuator 44 causes lowering and raising, respectively, of the respective subframe 40 about the horizontal pivot axis that is shared by the pivot points 52 where the links 42 connect to the mounting lugs 50. Each subframe 40 is thus raisable and lowerable relative to the outer frame 34 of the respective wing 30 of the implement about a horizontal pivot axis parallel to the longitudinal direction of the wing 30.

FIGS. 1 to 8 show the subframe 40 in a deployed position lying alongside the respective outer frame 34 in generally coplanar relationship thereto, whereby when the inner and outer frames lie coplanar to one another, the outer roller 38 lies generally parallel to the inner roller 36, but in a position horizontally offset therefrom. In the illustrated embodiment, each movable subframe 40 is pivotally mounted at the front side of the respective outer frame 34, whereby the deployed position of each subframe 40 positions the outer roller 38 in front of the respective outer frame so that the outer roller 38 leads the inner roller 36 in the forwarding working direction 14 of the implement. However, in other embodiments, the subframe 40 of either outer frame 34 may alternatively be coupled to the rear beam of the outer frame 34, whereby the deployed position of the subframe 40 would reside behind the respective outer frame 34 and thereby situate the outer roller 38 in a trailing position relative to the inner roller 36 of the same wing.

FIGS. 9 to 17 show the subframe 40 in a folded position withdrawn upwardly out of the deployed position and folded back over the topside of the outer frame 34 by the collapse of the respective hydraulic actuator 44. This places the outer roller 38 in a stowed position over the outer frame 34 at a height elevated over the inner roller 36 of the respective wing 30 of the implement. In this stowed position, the longitudinal axis of the outer roller 38 and the longitudinal axis of the inner roller 36 lie within a same vertical plane. With the wing 30 folded-in to the transport position of FIGS. 9 to 17 so as to lie parallel to the forward working direction 14 for compact-road transport or storage of the implement when not in use in the field, this coplanar relationship of the inner and outer rollers minimizes the collective width of the wings 30 of the implement in the transverse direction perpendicular to the forward working direction. It will be appreciated that the raising of the outer rollers up into their elevated positions above the inner rollers can help contribute to reduced-width transport or storage of the implement relevant to conventional folding land roller designs regardless of whether the outer rollers actually reach a point directly overlying the inner rollers, since even some degree of overlap of the outer rollers overtop of the inner rollers would still reduce the transport width of the wings compared to conventional side-by-side positioning of non-raisable rollers carried at fixed heights on the wing frames.

The outer frame 34 of each wing 30 features a respective ground wheel assembly 54. Each ground wheel assembly 54 includes a support shaft 56 that lies perpendicularly to the longitudinal direction of the wing 30 at an intermediate point along the beams 18 of the outer frame. The opposing ends of the shaft 56 are rotatably supported on the beams 18 of the outer frame to allow rotation of the shaft 56 about its central longitudinal axis. At or near a midpoint of the shaft's length, a pair of matching wheel mount plates 58 angle radially outward from the shaft, and at their distal ends carry a wheel post 60, to which a pair of ground wheels 62 are rotatably mounted near the bottom end of the post 60. A connection lug 64 stands upright from the shaft 56 near a respective end thereof, and a hydraulic linear actuator 66 has one end pivotally coupled to this connection lug 64, and an opposing end pivotally coupled to the one of the crossbars 19 of the outer frame 34 that resides on the side of the shaft 56 opposite the ground wheels 62. Extension and retraction of this actuator 66 therefore drives rotation of the shaft 56 in directions lowering and raising the ground wheels 62 about the axis of the shaft 56.

Having described the structure of the implement, attention is now turned to its operation. In the transport mode of the implement, the ground wheels 62 of the wings 30 are normally held in lowered positions by the wheel actuators 66. In these lowered positions, the ground wheels 62 reach further downward from the frames of the wings than the rollers 36, 38, whereby the wing rollers 36, 38 are elevated up off the ground. In a conventional manner, the transport wheels 28 of the central frame are likewise disposed in lowered positions during transport in order to lifting the center roller 26 off the ground. In the transport mode, the ground wheels 62 of the wings 30 are oriented in the manner shown in the drawings, where the wheel axes lie perpendicular to the longitudinal direction of the wings 30. This way, the wheels are oriented for rolling motion in the forward working direction 14. To convert the implement from the transport mode to the field working mode, the ground wheels 62 of the wings 62 are swiveled 90-degrees about the vertical axis of the post 60 so that their rotational axes instead lie parallel to the longitudinal direction of the wings (i.e. parallel to the rotational axes of the wing rollers 36, 38). The tractor 12 or other towing vehicle is then driven in reverse, which with the wings' ground wheels 62 in this position, pushes the central frame 16 backward, and thereby unfolds the wings. Suitable steering mechanisms for swivelling the ground wheels are known, such as that disclosed in CA2810124, and so further disclosure of the steering details is omitted herein.

Once the wings are unfolded into the working positions, the subframes 40 are deployed out of their folded-up positions over the outer frames 34 by extending the subframe actuators 44, thereby lowing the outer rollers 38 down into their useful positions alongside the outer frames 34. The ground wheels 62 of the wings 30 are swivelled back to their normal orientation about the upright axis of the wheel post 60, and the wheel actuators 66 are retracted to raise the ground wheels 62 upward and lower the wing rollers down against the ground. Similarly, for example using conventional means that are not detailed herein, the ground wheels 28 of the central frame are raised in order to lower the center roller 26 down into contact with the ground. In the illustrated embodiment, in which the raisable/lowerable outer rollers are situated ahead of the outer frames in the working position of the wings, the outer rollers may alternatively be lowered into their useful positions prior to folding-out of the wings from the transport position to the working position. Once the wings are folded-out, the implement is then ready for field use, with the rollers in a staggered pattern placing the raisable/lowerable outer wing rollers in positions forwardly offset from, and leading, the inner wing roller, and optionally in alignment with the central roller. Alternatively, either raisable/lowerable outer roller may be mounted to the rear of the wings, and thus lie in a position offset from, and trialing, both the central roller and the inner rollers when the implement is in the working mode.

FIG. 18 schematically illustrates a seven-roller implement 10' of the present invention, in which instead of two rollers per wing, the implement features three rollers per wing. The three rollers of each wing include the same two rollers 36, 38 of the first five-roller embodiment of the implement, plus a third roller section 68 having the same frame and roller structure as the inner roller, whereby the roller of this third section is of fixed, stationary height relative to its frame. The third roller is the outermost roller in this configuration, and the raisable/lowerable roller 38 is now an intermediate roller disposed between the inner and outer rollers in slight longitudinally overlapping relation therewith. That is, the third roller and corresponding frame reside adjacent an outboard end of the intermediate frame to which the intermediate roller is coupled by the movable subframe 40. In this version of the implement, the overall length of the implement is increased by the outer fixed-height rollers, which reside in alignment with the fixed-height inner rollers 32.

FIG. 19 schematically illustrates a nine-roller implement of the present invention, which adds a fourth roller to each wing of the seven-roller implement, specifically a raisable/lowerable outer roller section 70 having the same frame, subframe and ground wheel setup as described above. The drawing also illustrates how the movable subframe of one of more of the liftable rollers may be disposed at the rear of the respective wing frame section, as opposed to the front-mount arrangements of the other illustrated embodiments. In the illustrated nine-roller implement, the two raisable/lowerable roller sections on each wing have their movable subframes attached to opposing sides of the wing, so that the hydraulic lifting forces of the two counteract each other during simultaneous lifting of the two by their respective actuators. Also, in this configuration, the pivot pin between center section and the inner end of each wing does not have to bear the force of both subframes lifting on the same side.

While the innermost roller on each wing in the illustrated embodiments is a fixed-height roller mounted directly on the wing frame, and the next roller moving outwardly along the wing frame is a raisable/lowerable roller mounted on a movable subframe, other embodiments may employ the reverse configuration, where the innermost roller is raisable and lowerable on a respective subframe, with the second roller being a fixed-height stationary roller directly mounted to the wing frame. In such embodiments, both the seven-roller and nine-roller implements may feature two raisable/lowerable roller per wing at the first and third roller positions moving outwardly along each wing. Other embodiments may feature asymmetric positioning of the raisable/lowerable rollers on the two wings, for example with the first roller of one wing being raisable/lowerable and the first roller of the other wing being of fixed-height. In a seven or nine-roller embodiment with asymmetric positioning of the raisable/lowerable rollers, one wing would have more raisable/lowerable rollers than the other. However, such embodiments this may be less desirable in the interest of a well-balanced implement of minimal overall weight, as more movable subframes on one wing than the other would lead to an imbalanced design, unless the other wing was counterweighted, which would increase the overall implement weight and reducing the towing efficiency of the impliment.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A land roller implement for rolling movement across the ground in a forward working direction of a towing vehicle, the implement comprising:
   a central frame;
   a hitch member connected to the central frame and arranged for connection to the towing vehicle for movement therewith in the forward working direction;
   a first wing frame which is elongated in a first longitudinal direction between a first inner end that is pivotally coupled to the central frame and an opposing first outer end;
   a second wing frame which is elongated in a second longitudinal direction between a second inner end that is pivotally coupled to the central frame and an opposing second outer end;

the first wing frame being pivotal about a first upright axis between a first working position spanning laterally outward from the central frame so as to be oriented transversely to the forward working direction and a first transport position extending rearwardly from the central frame such that the first longitudinal direction of the first wing frame extends generally parallel to the forward working direction;

the second wing frame being pivotal about a second upright axis between a second working position spanning laterally outward from the central frame so as to be oriented transversely to the forward working direction and a second transport position extending rearwardly from the central frame such that the second longitudinal direction of the second wing frame extends generally parallel to the forward working direction;

a first first-wing roller and a second first-wing roller both supported on the first wing frame for rolling movement on the ground in the forward working direction in the first working position of the first wing frame, said first first-wing roller having a first proximal end residing adjacent the central frame and a first distal end spaced from the first proximal end in the first longitudinal direction and said second first-wing roller residing adjacent the first distal end of the first first-wing roller in the first longitudinal direction;

a first second-wing roller and a second second-wing roller both supported on the second wing frame for rolling movement on the ground in the forward working direction in the second working position of the second wing frame, said first second-wing roller having a second proximal end residing adjacent the central frame and a second distal end spaced from the second proximal end in the second longitudinal direction and said second second-wing roller residing adjacent the second distal end of the first second-wing roller in the second longitudinal direction;

wherein one of said first and second first-wing rollers is a raisable and lowerable first-wing roller carried on a movable first-wing subframe pivotally coupled to the first wing frame, the movable first-wing subframe being pivotal about a first pivot axis lying generally parallel to the first longitudinal direction of the first wing frame for raising and lowering of said movable first-wing subframe about the first pivot axis between a first folded position overlying the first wing frame with said raisable and lowerable first-wing roller elevated over the other of said first and second first-wing rollers, and a first deployed position lying alongside the first wing frame with said raisable and lowerable first-wing roller lowered onto the ground for rolling movement thereover in the forward working direction; and wherein one of said first and second second-wing rollers is a raisable and lowerable second-wing roller carried on a movable second-wing subframe pivotally coupled to the second wing frame, the movable second-wing subframe being pivotal about a second pivot axis lying generally parallel to the second longitudinal direction of the second wing frame for raising and lowering of said movable second-wing subframe about the second pivot axis between a second folded position overlying the second wing frame with said raisable and lowerable second-wing roller elevated over the other of said first and second second-wing rollers, and a second deployed position lying alongside the second wing frame with said raisable and lowerable second-wing roller lowered onto the ground for rolling movement thereover in the forward working direction.

2. The land roller implement of claim 1 wherein:
the first wing frame comprises a first ground wheel assembly mounted thereto at a first location that resides beneath the movable first-wing subframe in the first folded position thereof, said first ground wheel assembly comprising at least one first-wing ground wheel that is lowerable against the ground to lift the first wing frame and bring the other of said first and second first-wing rollers out of contact with the ground, and raisable from the ground to lower the first wing frame and bring the other of said first and second first-wing rollers thereof into contact with the ground; and
the second wing frame comprises a second ground wheel assembly mounted thereto at a second location that resides beneath the movable second-wing subframe in the second folded position thereof, said second ground wheel assembly comprising at least one second-wing ground wheel that is lowerable against the ground to lift the second wing frame and bring the other of said first and second second-wing rollers out of contact with the ground, and raisable from the ground to lower the second wing frame and bring the other of said first and second second-wing rollers thereof into contact with the ground.

3. The land roller implement of claim 2 wherein the first ground wheel assembly comprises a first support shaft spanning transversely between first side members of the first wing frame that lie in the first longitudinal direction thereof, and the second ground wheel assembly comprises a second support shaft spanning transversely between second side members of the second wing frame that lie in the second longitudinal direction thereof.

4. The land roller implement of claim 3 wherein:
the first support shaft of the first ground wheel assembly is rotatable, and the first ground wheel assembly comprises a first ground wheel actuator coupled to the first support shaft to drive rotation thereof in opposite directions to raise and lower the first-wing ground wheel; and
the second support shaft of the second ground wheel assembly is rotatable, and the second ground wheel assembly comprises a second ground wheel actuator coupled to the second support shaft to drive rotation thereof in opposite directions to raise and lower the second-wing ground wheel.

5. The land roller implement of claim 4 wherein the first ground wheel actuator comprises a first linear actuator coupled between the first wing frame and a first connection lug on the first support shaft, and the second ground wheel actuator comprises a second linear actuator coupled between the second wing frame and a second connection lug on the second support shaft.

6. The land roller implement of claim 1 wherein the first wing frame has a third first-wing roller rotatably supported thereon at a first outboard position situated adjacent a first outboard end of the movable first-wing subframe for rolling movement on the ground in the forward working direction in the first working position of the first wing, and the second wing frame has a third second-wing roller rotatably supported thereon at a second outboard position situated adjacent a second outboard end of the movable second-wing subframe for rolling movement on the ground in the forward working direction in the second working position of the second wing.

7. The land roller implement of claim 6 wherein:
the first and third first-wing rollers align with one another, and the second first-wing roller is the raisable and lowerable first-wing roller and is forwardly or rearwardly offset from the first and third first-wing rollers in the forward working direction when the movable first-wing subframe is in the first deployed position; and
the first and third second-wing rollers align with one another, and the second second-wing roller is the raisable and lowerable second-wing roller and is forwardly or rearwardly offset from the first and third second-wing rollers in the forward working direction when the movable second-wing subframe is in the second deployed position.

8. The land roller implement of claim 6 wherein:
the first wing frame comprises a fourth first-wing roller rotatably carried on a second movable first-wing subframe that is pivotally coupled to the first wing frame in like manner to the movable first-wing subframe on which the raisable and lowerable first-wing roller is carried for rolling movement of the fourth first-wing roller on the ground in the forward working direction when the second movable first-wing subframe is deployed with the first wing frame in the first working position; and
the second wing frame comprises a fourth second-wing roller rotatably carried on a second movable second-wing subframe that is pivotally coupled to the second wing frame in like manner to the movable second-wing subframe on which the raisable and lowerable second-wing roller is carried for rolling movement of the fourth second-wing roller on the ground in the forward working direction when the second movable second-wing subframe is deployed with the second wing frame in the second working position.

9. The land roller implement of claim 6 wherein:
the first wing frame comprises a fourth first-wing roller supported thereon, and one of the rollers of the first wing frame is a second raisable and lowerable first-wing roller rotatably carried on a second movable first-wing subframe that is pivotally coupled to the first wing frame in like manner to the movable first-wing subframe on which the raisable and lowerable first-wing roller is carried, thereby enabling rolling movement of the second raisable and lowerable first-wing roller on the ground in the forward working direction when the second movable first-wing subframe is deployed with the first wing frame in the first working position; and
the second wing frame comprises a fourth second-wing roller supported thereon, and one of the rollers of the second wing frame is a second raisable and lowerable second-wing roller rotatably carried on a second movable second-wing subframe that is pivotally coupled to the second wing frame in like manner to the movable second-wing subframe on which the raisable and lowerable second-wing roller is carried, thereby enabling rolling movement of the second raisable and lowerable second-wing roller on the ground in the forward working direction when the second movable second-wing subframe is deployed with the second wing frame in the second working position.

10. A land roller implement for rolling movement across the ground in a forward working direction of a towing vehicle, the implement comprising:
a central frame;
a hitch member connected to the central frame and arranged for connection to the towing vehicle for movement therewith in the forward working direction;
a first wing frame which is elongated in a first longitudinal direction between a first inner end that is pivotally coupled to the central frame and an opposing first outer end;
a second wing frame which is elongated in a second longitudinal direction between a second inner end that is pivotally coupled to the central frame and an opposing second outer end;
the first wing frame being pivotal about a first upright axis between a first working position spanning laterally outward from the central frame so as to be oriented transversely to the forward working direction and a first transport position extending rearwardly from the central frame such that the first longitudinal direction of the first wing frame extends generally parallel to the forward working direction, the first frame having a first first-wing roller supported on the first wing for rolling movement on the ground in the forward working direction in the first working position of the first wing frame, said first first-wing roller having a first proximal end residing adjacent the central frame and a first distal end spaced from the first proximal end in the first longitudinal direction;
the second wing frame being pivotal about a second upright axis between a second working position spanning laterally outward from the central frame so as to be oriented transversely to the forward working direction and a second transport position extending rearwardly from the central frame such that the second longitudinal direction of the second wing frame extends generally parallel to the forward working direction, the second wing frame having a first second-wing roller supported on the second wing for rolling movement on the ground in the forward working direction in the second working position of the second wing frame, said first second-wing roller having a second proximal end residing adjacent the central frame and a second distal end spaced from the second proximal end in the second longitudinal direction;
a movable first-wing subframe pivotally coupled to the first wing frame at a position residing adjacent the first distal end of the first first-wing roller, the movable first-wing subframe being pivotal about a first pivot axis lying generally parallel to the first longitudinal direction of the first wing frame for raising and lowering of said movable first-wing subframe about the first pivot axis between a first folded position overlying the first wing frame and a first deployed position lying alongside the first wing frame;
a movable second-wing subframe pivotally coupled to the second wing frame at a position residing adjacent the second distal end of the first second-wing roller, the movable second-wing subframe being pivotal about a second pivot axis lying generally parallel to the second longitudinal direction of the second wing frame for raising and lowering of said movable second-wing subframe about the second pivot axis between a second folded position overlying the second wing frame and a second deployed position lying alongside the second wing frame;
a second first-wing roller supported on the movable first-wing subframe of the first wing frame for rolling movement on the ground in the forward working direction in the first deployed position of the movable first-wing subframe and the first working position of the first wing frame, the movable first-wing subframe being arranged to elevate the second first-wing roller above the first first-wing roller under raising of the movable first-wing subframe from the first deployed position into the first folded position; and a second second-wing roller supported on the movable second-wing subframe of the second wing frame for rolling movement on the ground in the forward working direction in the second deployed position of the movable second-wing subframe and the second working position of the second wing frame, the movable second-wing subframe being arranged to elevate the second second-wing roller above the first second-wing roller under raising of the movable second-wing subframe from the second deployed position into the second folded position.

11. The land roller implement of claim 1 wherein the first and second first-wing rollers overlap one another in the first longitudinal direction of the first wing frame and the first and second second-wing rollers overlap one another in the second longitudinal direction of the second wing frame.

* * * * *